US008607664B2

(12) United States Patent
Solak et al.

(10) Patent No.: US 8,607,664 B2
(45) Date of Patent: Dec. 17, 2013

(54) FLUID MOTION CONTROL DEVICE

(75) Inventors: Addison T. Solak, Ypsilanti, MI (US); David J. Varda, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1259 days.

(21) Appl. No.: 12/102,248

(22) Filed: Apr. 14, 2008

(65) Prior Publication Data

US 2009/0255369 A1 Oct. 15, 2009

(51) Int. Cl.
*F16H 57/04* (2010.01)

(52) U.S. Cl.
USPC .......... 74/606 R; 184/6.12

(58) Field of Classification Search
USPC ........ 74/606 R; 184/6.2, 6.23, 6.24, 106, 1.5, 184/6.12; 137/67, 395; 210/87, 167.08, 210/172.1, 650
See application file for complete search history.

(56) References Cited

U.S. PATENT DOCUMENTS 1,305,355 A * 6/1919 Gulick .......... 184/6.24
1,671,391 A * 5/1928 Winslow et al. .......... 184/106
3,106,263 A * 10/1963 McKellar .......... 184/106
3,171,820 A * 3/1965 Volz .......... 521/61
4,070,300 A * 1/1978 Moroni et al. .......... 252/190
4,352,737 A * 10/1982 Taniguchi .......... 210/455
4,666,594 A * 5/1987 Schneider .......... 210/167.08
4,995,971 A * 2/1991 Droste et al. .......... 210/167.03
5,146,748 A * 9/1992 Okada .......... 60/454
5,314,616 A * 5/1994 Smith .......... 210/130
5,465,692 A * 11/1995 Uraki et al. .......... 123/195 C
6,143,169 A * 11/2000 Lee .......... 210/167.02
6,217,758 B1 * 4/2001 Lee .......... 210/167.06
6,290,843 B1 * 9/2001 Lee et al. .......... 210/167.08
6,488,844 B2 12/2002 Willis et al.

FOREIGN PATENT DOCUMENTS

| | | |
|---|---|---|
| DE | 103 42 894 A1 | 4/2005 |
| EP | 0 231 993 B1 | 4/1990 |
| JP | 03-233013 A | 10/1991 |
| JP | 2005 069 395 A | 3/2005 |
| JP | 2006-214455 A | 8/2006 |

* cited by examiner

*Primary Examiner* — Thomas Diaz

(57) ABSTRACT

A porous insert for a gearbox or transmission which retards fluid motion and flow within the device when it is subjected to rapid acceleration. The insert may be fabricated of any porous material such as open cell plastic foam, a porous ceramic or sintered metal and is shaped to conform to and is installed in a bottom rear region of the transmission housing. The insert retards motion of the fluid during rapid acceleration, preventing pump starvation and permitting a smaller charge of fluid to be placed in the gearbox or transmission.

11 Claims, 2 Drawing Sheets

FLUID MOTION CONTROL DEVICE

FIELD

The present disclosure relates to fluid motion control devices for gearboxes and transmissions and more particularly to an insert for gearboxes and transmissions which reduces unwanted fluid movement during acceleration.

BACKGROUND

The statements in this section merely provide background information related to the present disclosure and may or may not constitute prior art.

Modern multiple speed motor vehicle automatic transmissions typically include a pressurized oil system including a logic or shift control assembly, a plurality of hydraulically operated clutches and brakes and an oil pump which provides a flow of pressurized oil.

The pressurized oil is supplied to the various assemblies and is also utilized to lubricate and cool bearings and various assemblies such as clutches and brakes whereupon it is returned to a sump from which the pump draws oil, pressurizes it and recirculates it.

During hard vehicle acceleration, the inertia of the oil in the sump of the transmission will cause it to move to and accumulate in the rear of the transmission housing. The oil charge within the transmission is selected to ensure that, notwithstanding this accumulation, the filter inlet in the sump will always be submerged in the oil to prevent oil starvation and allow the pump to draw in air. Should this occur, the pump will cavitate and the delivered oil pressure may drop.

One apparent solution to this problem is simply to increase the oil charge in the transmission. This solution is generally unacceptable, however, for at least two reasons. First of all, an increased oil charge simply adds to the weight of the vehicle. Second of all, due to the significant expansion of the oil as its temperature increases, an increased oil charge sufficient to positively prevent pump starvation during rapid acceleration at cold temperatures will result in an oil volume at high temperatures that will impinge upon rotating members within the transmission. This is undesirable as it can cause power loss, increased frictional heating of the oil and decreased performance of the powertrain.

Another approach has been to secure baffles to the inside of the transmission oil pan to retard oil flow to the rear of the oil pan and transmission during acceleration. While reasonably effective, the baffles increase the weight of the oil pan and add to its complexity and production cost.

From the foregoing explanation, it is apparent that improvements in the art of fluid motion control within gearboxes and transmissions would be desirable and the present invention is so directed.

SUMMARY

The present invention provides a porous insert for a gearbox or transmission which retards fluid motion and flow within the device when it is subjected to rapid acceleration. In such situations, the inertia of the oil in the housing of the gearbox or transmission causes it to move to the rear portion of the housing which may result in starvation of the oil pump, cavitation and loss of delivered oil pressure. The insert is located generally at the bottom rear of the housing and provides a permeable barrier which retards fluid flow and accumulation of the oil at the rear of the housing. The insert may be fabricated of any porous material such as open cell plastic foam, a porous ceramic or sintered metal and is shaped to conform to a bottom rear region of the housing. The insert retards motion of the oil during rapid acceleration, preventing oil pump starvation and permitting a smaller charge of oil to be placed in the gearbox or transmission.

Thus it is an object of the present invention to provide a device for retarding motion of fluid within the housing of a gearbox or transmission.

It is a further object of the present invention to provide a permeable insert for disposition in the housing of a gearbox or transmission which reduces unwanted fluid movement.

It is a still further object of the present invention to provide a permeable insert for disposition in the housing of a gearbox or transmission which reduces unwanted fluid movement during rapid acceleration.

It is a still further object of the present invention to provide a permeable insert for disposition in the rear of a housing of a gearbox or transmission which reduces unwanted fluid movement and accumulation at the rear of the housing during rapid acceleration.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
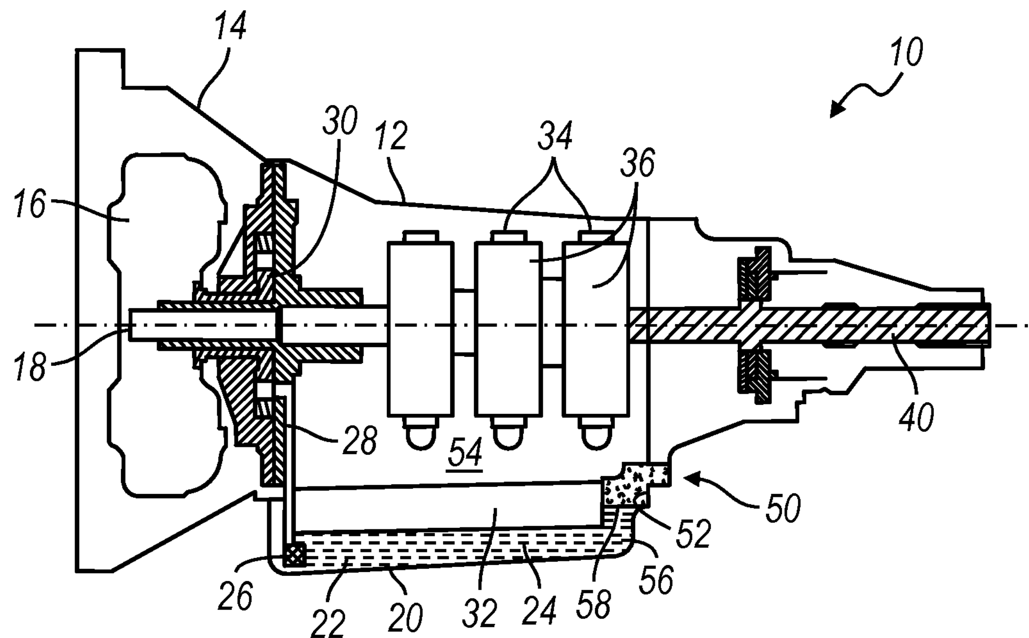
FIG. 1 is a side elevational view of an automatic transmission incorporating the present invention with a portion of the housing broken away.

Referring now to FIG. 1, an exemplary gearbox or transmission such as an automatic transmission incorporating the present invention is illustrated and generally designated by the reference number 10, The automatic transmission 10 includes a typically cast metal housing 12 including an end bell 14 which receives a torque converter 16 having an input driven by a prime mover such as an internal combustion engine and an output which is coupled to and drives an input shaft 18 of the automatic transmission 10. The housing 12 also includes an oil pan 20 at its lowermost region which defines a sump 22. Transmission fluid or oil 24 collects in the sump 22 and is drawn through an intake filter 26 and through a suction line 28 into a hydraulic pump 30 such as a gear pump or gerotor pump. The hydraulic pump 30 is typically driven by the input shaft 18.

The output of the hydraulic pump 30 is provided to a valve body 32 and ultimately to a plurality of actuators (not illustrated) associated with a plurality of clutch and brake assemblies 34 which selectively engage and disengage or ground various components of a plurality of planetary gear assemblies 36 in accordance with known practice to achieve a plurality of forward speed or gear ratios and reverse. Oil flow from the hydraulic pump 30 is also utilized by and supplied to bearings for lubrication and to the clutch and brake assemblies 34 to cool them. An output shaft 40 carries the output of the transmission 10 to a final drive assembly (not illustrated) which typically comprehends a differential, a pair of axles and pairs of tires and wheels.

Figure 2:
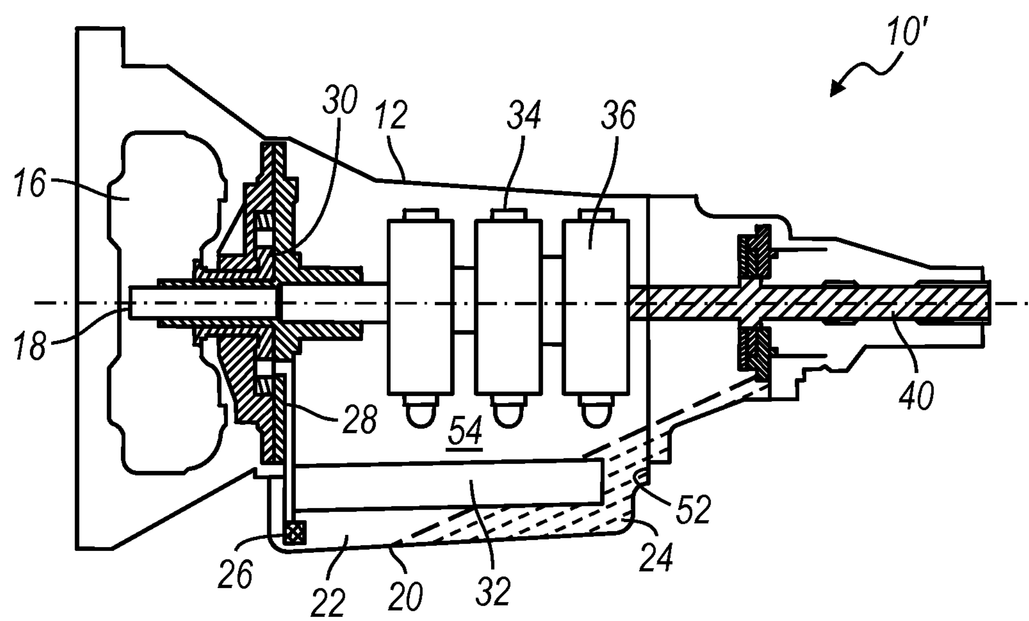
FIG. 2 is a side elevational view of an automatic transmission experiencing rapid acceleration and flow of transmission oil to the rear of the housing.

FIG. 2 illustrates an automatic transmission 10' disposed in a vehicle (not illustrated) undergoing rapid acceleration. Comparison and study of FIGS. 1 and 2 reveal both a typical operating level of the transmission fluid or oil 24 at approximately the top of the valve body in FIG. 1 and significant space at the rear of the transmission housing 12 near the output shaft 40. During hard acceleration, illustrated in FIG. 2, the transmission fluid or oil 24 forms a wave which moves to the rear of the transmission 10. As a wave of transmission fluid or oil 24 moves to the rear of the transmission 10, the intake filter 26 may no longer be submerged in the oil 24 and the hydraulic pump 30 may begin to draw in air and cavitate. A loss of delivered hydraulic pressure may then occur.

Returning to FIG. 1, it will be appreciated that a fluid motion control device 50 according to the present invention is disposed within and at the rear of the transmission housing 12. Preferably, the motion control device 50 extends between and sealingly and intimately engages a rear inner surface 52 and left and right sidewalls 54 of the housing 12 and the oil pan 20 thereby defining a volume or space 56 between a lower surface 58 of the motion control device 50 and the oil pan 20. The motion control device 50 is disposed in the transmission housing 12 so that when the fluid or oil 24 is at a cold temperature and the vehicle is in a steady state i.e., it is neither accelerating nor decelerating, the lower surface 58 of the fluid motion control device 50 is approximately coplanar with the upper surface of the transmission fluid or oil 24.

Figure 3:
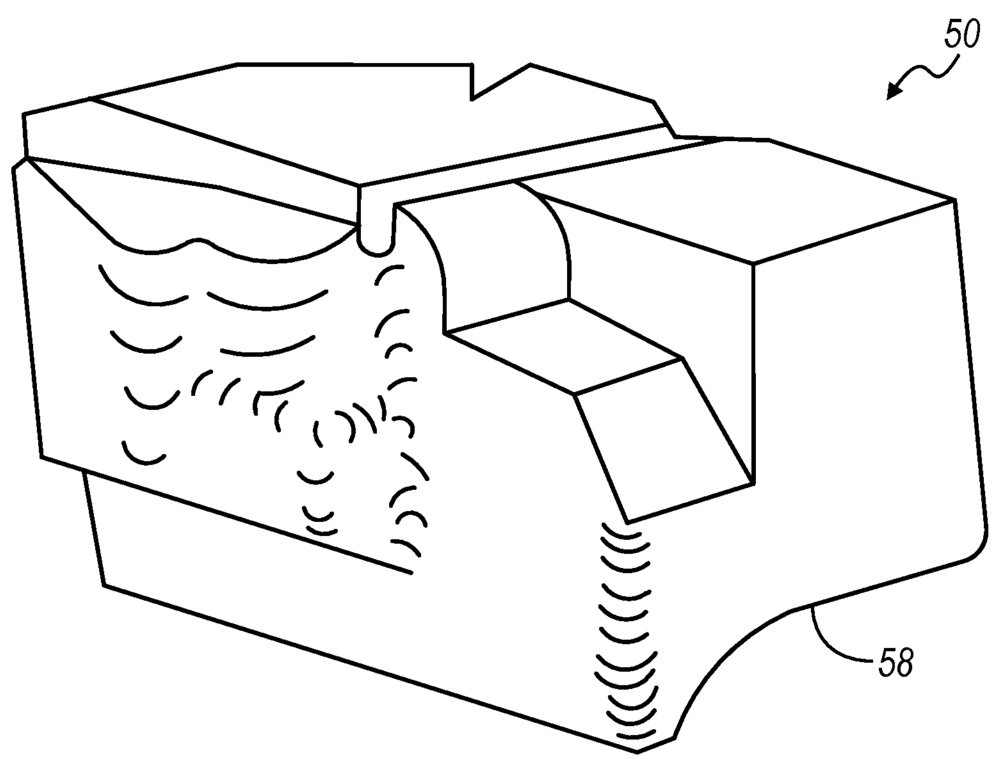
FIG. 3 is a perspective view of a flow retarding insert for a gearbox or transmission according to the present invention.

Referring now to FIG. 3, a fluid motion control device 50 is illustrated. The device 50 is an insert or block of material shaped to conform to the rear inner surface 52 and the sidewalls 54 of the housing 12 of the transmission 10 where it will be located. Its shape is dictated not only by the shape of the rear inner surface 52 and the spacing of the sidewalls 54 of the transmission housing 12 but also by various components within the transmission 10 which it must fit around or near without interference. Thus its shape may vary significantly from the configuration illustrated.

Preferably, the fluid motion control device 50 is fabricated of a porous or permeable material such as open cell plastic foam. Fabrication of the motion control device 50 of plastic foam is advantageous due to its light weight but the plastic material must exhibit good compatibility and extended service life with the intended transmission fluid or oil 24 and any additives. Additionally, the material from which the fluid motion control device 50 is fabricated must be semi-rigid such that it retains its shape. Some resiliency of the material is also desirable so that the control device 50 may be force or interference fit into the transmission housing 12 to retain it in a desired location. The control device 50 may also be fabricated of wire mesh or screen or more rigid and rugged materials such as sintered metal or a porous ceramic. Other porous or permeable materials providing restricted through flow, which exhibit the necessary fluid compatibility and which are capable of fabrication into a block or insert of the desired shape may also be utilized.

Because the viscosity of the transmission fluid or oil 24 varies significantly with temperature, an optimum pore size of the fluid motion control device 50 at cold temperatures and high viscosities will be larger than the optimum pore size at higher temperatures and lower viscosities. Additionally, there is the issue of how quickly the fluid or oil 24 should pass through the control device 50 and to what extent it should act essentially as an impermeable barrier that inhibits flow or sloshing in the short term but absorbs a portion of the fluid or oil 24 as it heats and expands in the long term. Thus it is somewhat difficult to specify an optimum pore size as it is generally determined by compromise and experiment. Nonetheless, it has been found that nominal pore size in the range of from 0.005 inches (0.0127 mm.) to 0.06 inches (1.524 mm.) is effective and that nominal pore size in the range of from 0.008 inches (0.203 mm.) to 0.031 inches (0.787 mm.) is preferable.

It will be appreciated that the fluid motion control device 50 acts essentially as a fluid motion damper which temporarily absorbs not only transmission fluid or oil during acceleration transients but also a portion of its kinetic energy. The fluid control device 50 is, of course, also capable of absorbing or being filled by fluid or oil 24 on a more long term basis which will occur as the temperature of the fluid or oil 24 and its volume increases. It should also be appreciated that although described above as disposed at the rear of a transmission housing 12, the fluid control device may be installed along the lower portion of one or both sides of a transmission housing to retard lateral or transverse motion of fluid as the transmission is subjected to lateral or transverse accelerative or decelerative forces.

The description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A transmission lubrication system for lubricating components of a transmission, the transmission lubrication system comprising:

a transmission housing having a pair of side walls, and an oil pan, the oil pan having a front end thereof and a rear end thereof;

a valve body disposed between the pair of side walls and opposing the oil pan of the transmission housing, wherein the valve body, the pair of side walls of the transmission housing, and the oil pan of the transmission housing define a sump and a sump intake located between a rear end of the valve body and the rear end of the oil pan;

a hydraulic pump including a pump intake disposed in the sump at the front end of the oil pan; and a porous member disposed in and substantially filling the sump intake, and wherein the transmission lubrication system circulates a hydraulic fluid from the sump through the pump intake to the pump, through the transmission components, and through the porous member and the sump intake to the sump.

2. The transmission lubrication system of claim 1, wherein the porous member retards fluid motion of the hydraulic fluid out of the sump during acceleration.

3. The transmission lubrication system of claim 2 wherein the porous member has a lower surface that is disposed at about an upper surface of the hydraulic fluid in the sump when the transmission lubrication system is at rest on a level ground.

4. The transmission lubrication system of claim 1 wherein the porous member is fabricated of shape retaining material.

5. The transmission lubrication system of claim 1 wherein the porous member is comprised of open cell plastic foam.

6. The transmission lubrication system of claim 1 wherein a nominal pore size of the porous member is in a range of 0.005 inches to 0.06 inches.

7. The transmission lubrication system of claim 6 wherein the nominal pore size is in the range of 0.008 inches to 0.031 inches.

8. The transmission lubrication system of claim 1 wherein the porous member is disposed adjacent to a transmission output shaft.

9. A transmission lubrication system for lubricating components of a transmission, the transmission lubrication system comprising:

a transmission housing having a pair of side walls, and an oil pan, the oil pan having a front end thereof and a rear end thereof;

a valve body disposed between the pair of side walls and opposing the oil pan of the transmission housing, wherein the valve body, the pair of side walls of the transmission housing, and the oil pan of the transmission housing define a sump and a sump intake located between a rear end of the valve body and the rear end of the oil pan;

a hydraulic pump including a pump intake disposed in the sump at the front end of the oil pan;

a hydraulic fluid disposed in the sump; and a porous member disposed in and substantially filling the intake portion of the sump, and wherein the transmission lubrication system circulates the hydraulic fluid from the sump through the pump intake to the pump, through the transmission components, and through the porous member and the sump intake to the sump.

10. The transmission lubrication system of claim 9 wherein the porous member is comprised of open cell plastic foam.

11. The transmission lubrication system of claim 10 wherein a nominal pore size of the porous member is in a range of 0.008 inches to 0.031 inches.

* * * * *